UNITED STATES PATENT OFFICE.

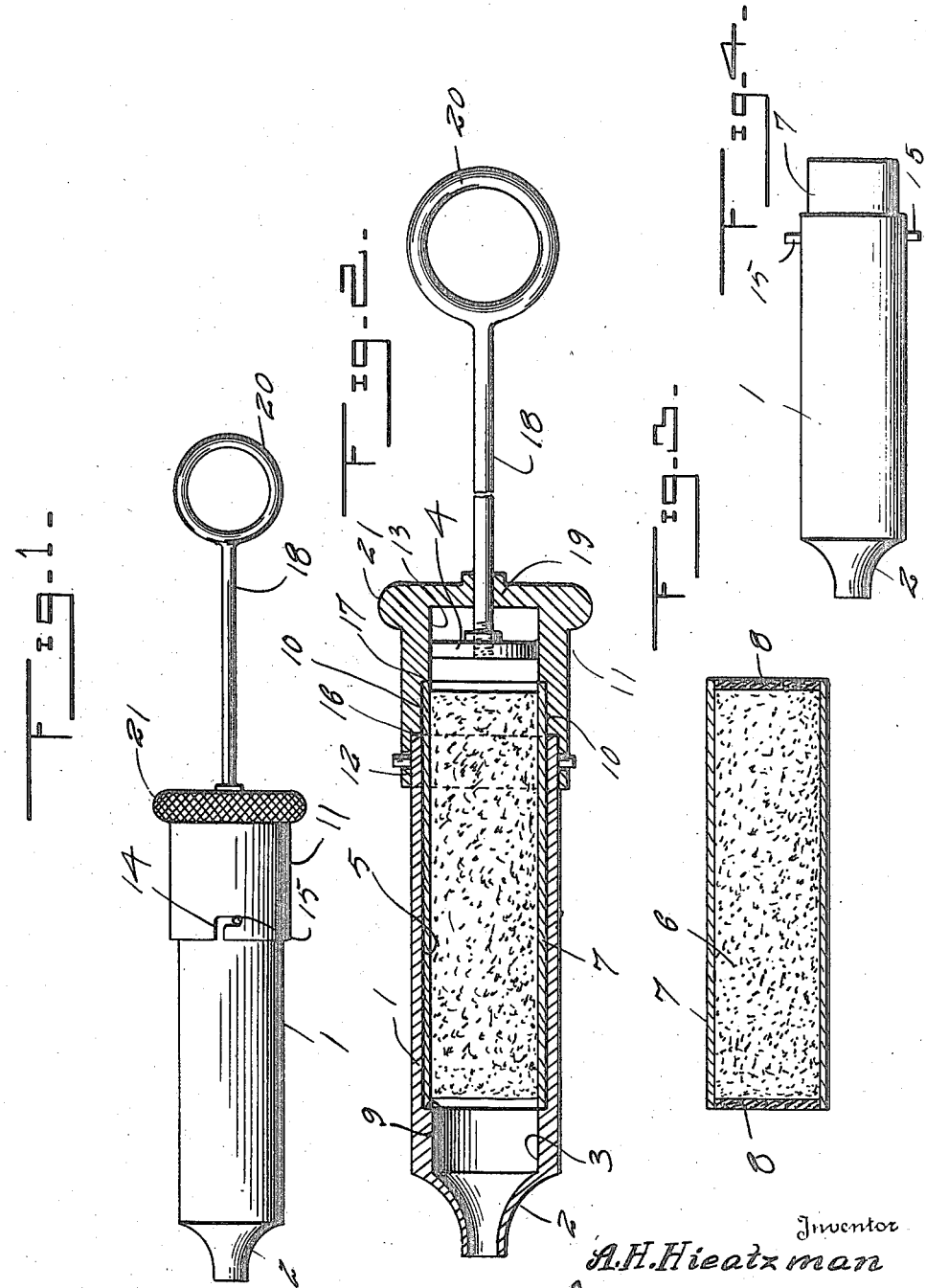

ARTHUR H. HIEATZMAN, OF BALTIMORE, MARYLAND, ASSIGNOR OF ONE-HALF TO WILLIAM A. SNYDER, OF BALTIMORE, MARYLAND.

GREASE-GUN.

1,269,438.　　　　Specification of Letters Patent.　　Patented June 11, 1918.

Application filed June 4, 1917.　Serial No. 172,699.

*To all whom it may concern:*

Be it known that I, ARTHUR H. HIEATZMAN, a citizen of the United States, residing in the city of Baltimore and State of Maryland, have invented certain new and useful Improvements in Grease-Guns; and I do hereby declare the following to be a full, clear, and exact description of the invention, such as will enable others skilled in the art to which it appertains to make and use the same.

The invention relates to a grease gun.

The object of the present invention is to improve the construction of grease guns and to provide a simple, practical and efficient grease gun of strong, durable and inexpensive construction designed to receive a cartridge of hard grease and capable of enabling the required pressure to be readily exerted on the same to force the hard or stiff grease from the gun without liability of producing a leakage of the grease.

A further object of the invention is to provide a cartridge receiving grease gun of this character adapted to be readily opened and closed to afford access to its interior for the introduction of a cartridge and the removal of the empty shell or casing, and adapted to permit the empty shell of the cartridge to be easily extracted from the body of the grease gun.

With these and other objects in view, the invention consists in the construction and novel combination of parts hereinafter fully described, illustrated in the accompanying drawing and pointed out in the claims hereto appended; it being understood that various changes in the form, proportion, size and minor details of construction, within the scope of the claims, may be resorted to without departing from the spirit or sacrificing any of the advantages of the invention.

In the drawing:

Figure 1 is a side elevation of a grease gun constructed in accordance with this invention.

Fig. 2 is a longitudinal sectional view of the same, a cartridge being in position.

Fig. 3 is a longitudinal sectional view of the cartridge illustrating the arrangement of the end seal.

Fig. 4 is a detail view of the body portion of the grease gun and the cartridge, showing the projecting arrangement of the latter.

Like numerals of reference designate corresponding parts in the several figures of the drawing.

In the accompanying drawing, in which is illustrated the preferred embodiment of the invention, the grease gun comprises in its construction a cylindrical body 1 provided with a nozzle 2 and having a bore or opening 3 of the diameter of a plunger 4 and a counter-bore or portion 5 for the reception of a cartridge 6 of grease. The enlargement or counterbore for the cartridge of grease is of a depth corresponding to the thickness of the shell 7 of the cartridge and the internal diameter of the shell corresponds with the diameter of the plunger 4 and is arranged in flush relation with the interior of the portion 3. The shell 7 of the cartridge is designed to be constructed of non-grease absorbing paper or other suitable material. The shell of the cartridge, which is filled with stiff or hard grease, is provided with end seals 8 of paraffin or other suitable material adapted to be readily removed prior to the introduction of the cartridge into the grease gun, and when the cartridge is introduced into the grease gun its front end abuts against the shoulder 9 formed by the counter-bore of the opening to form the shell receiving or cartridge receiving portion, and the said cartridge extends beyond the inner end of the cylindrical body into an intermediate shell receiving portion 10 of a cap 11.

The cap 11 is provided with an opening consisting of an inner portion 12, the said intermediate portion 10 and an outer portion 13 which is of the diameter of the plunger 4. The inner portion of the opening of the cap receives the inner end of the cylindrical body, and the cap is provided with opposite bayonet slots 14 adapted to receive lateral projections 15 of the body, whereby the cap is detachably interlocked with the said body. The cap is provided with an interior shoulder 16 formed by the inner portion or enlargement 12 of the cap to fit against the inner or rear end of the body and the intermediate cartridge receiving portion 10 of the opening of the cap forms a shoulder 17 which fits against the inner or rear end of the said cartridge and enables the cap to hold the cartridge in its proper position.

The extension of the cartridge beyond the inner or rear end of the body enables the cartridge to be readily removed after the grease has been consumed. Also the extension of the cartridge beyond the joint between the cap and the body obviates the necessity of employing a grease tight connection as the shell of the body will prevent any escape of the grease at such joint or connection and considerable force may be employed to force the grease from the gun and a relatively stiff or hard grease may be used when desired. The piston is provided with a rod 18 extending through a central opening 19 of the end wall of the cap and provided with a ring 20 or other suitable grip. As the interior diameter of the shell corresponds with the diameter of the piston, the piston may be forced through the shell into the outer portion of the bore or opening of the cylindrical body so as to completely remove the grease from the shell and the inner or rear portion of the opening of the cap is adapted to receive the piston, as shown in Fig. 2, to carry the said piston rearwardly beyond the shell receiving portion of the device. This will prevent the piston from interfering with the introduction of the cartridge into the device or the removal of the shell therefrom. The interlocking connection between the cap and the hollow vertical body enables the cap to be quickly placed on and removed from the body. The cap is enlarged at the rear end to form an annular portion 21 which is roughened to enable it to be readily gripped for manipulating the cap to engage it with and disengage it from the body.

What is claimed is:

1. A grease gun of the class described including a hollow cylindrical body provided at its outer end with a nozzle and having a piston bore adjacent to the same and provided with a counter-bore or enlargement of its opening extending inwardly or rearwardly from the piston bore to the inner end of the said body, a cap fitted on the body and provided adjacent to the same with a cartridge receiving portion of the diameter of the counter-bore of the said body to permit a cartridge to project beyond the inner end of the body to the cap, the latter being provided at its inner end beyond the cartridge with a piston bore, and a piston operating in the cap and the body and being of the diameter of the interior of the cartridge and adapted to pass through the same.

2. A device of the class described including a piston, a hollow cylindrical body provided at the outer end with a nozzle and having a bore or opening, the diameter of the bore or opening adjacent to the nozzle being that of the piston and being enlarged therefrom to the inner end of the body, the thickness of the shell of a cartridge to permit the interior of the shell to be arranged in flush relation with the front portion of the bore or opening and to permit the piston to pass through the shell of the cartridge, and a cap fitted on the cylindrical body and provided adjacent to the same with a bore or opening of the diameter of the cartridge to permit the latter to project into the cap and the bore or opening thereof being reduced beyond the cartridge to fit the piston.

3. A grease gun of the class described including a hollow cylindrical body provided at the front end with a nozzle and having a bore or opening composed of front and rear portions of different diameters, the rear portion being of a size to receive a cartridge and permit the shell thereof to be arranged with its inner surface in flush relation with the front portion of the opening, a cap having a longitudinal bore or opening composed of inner intermediate and rear portions, the inner portion fitting the inner end of the cylindrical body and the intermediate portion forming a continuation of the rear portion of the opening of the body to permit a shell or cartridge to extend into the cap and project beyond the body, and a piston operating in the cap and the body and being of a diameter to fit the interior of the cap at the outer portion thereof and the front portion of the bore or opening of the said body and also the interior of the shell of the cartridge.

4. A grease gun including a cylindrical body having a nozzle at the front end and having the rear portion of its bore or opening enlarged the thickness of the shell of a cartridge to permit a cartridge to be arranged within the body with the interior of the shell in flush relation with the front portion of the bore or opening of the body, said shell projecting beyond the rear end of the body, a cap having a bore or opening enlarged at the front end to fit the exterior of the body and form a shoulder for engaging the rear end thereof, the intermediate portion of the opening of the cap being of a diameter to receive the projecting portion of the cartridge and forming a shoulder for engaging the inner end of the shell, a piston operating in the cap and the body, and means for detachably interlocking the cap and the body.

5. A grease gun of the class described consisting of a hollow cylindrical body provided at its outer end with a nozzle, a cartridge of grease arranged within with the end projecting from the inner end of said body, a cap fitted on the body and provided adjacent to the same with a counter bore of sufficient diameter to inclose the end of the cartridge projecting from the hollow cylindrical body portion, the said cap being provided at its inner end beyond the cartridge with a piston bore of the same diameter as the interior of the cartridge, and a piston of similar diameter operating therein.

6. A grease gun of the class described including a grease cartridge, a means for entirely enveloping the said cartridge consisting of a hollow cylindrical body provided with a nozzle at its outer end, a cap fitted on the inner end of the body, and means for detachably interlocking the cap and the body, said cartridge extending in advance and in rear of the joint between the cap and the body, a plunger entirely inclosed within said hollow cylindrical body and cap whereby the cartridge is emptied without loss or leakage, and the said cartridge projecting from the body when the cap is removed whereby the shell of the cartridge may be readily extracted from the body.

7. A grease gun of the class described including a grease cartridge, a means for entirely enveloping the said cartridge consisting of a hollow cylindrical body provided with a nozzle at its outer end, a cap detachably fitted on the inner end of the body, said cartridge extending in advance and in rear of the joint between the cap and the body, and a plunger inclosed within the said hollow cylindrical body and cap whereby the cartridge may be emptied without loss or leakage, said cartridge projecting from the rear end of the body when the cap is removed to enable the shell of the cartridge to be readily extracted from the body.

8. A grease gun of the class described including a hollow cylindrical body provided with a nozzle, a cap fitted on the body at one end thereof, a piston operating within the cap and the body, and a tubular member fitting the interior of the body and the cap and spanning the joint between the same to prevent leakage of grease thereat, said tubular member carrying a charge of grease.

In testimony whereof I affix my signature in presence of two witnesses.

ARTHUR H. HIEATZMAN.

Witnesses:
 JAMES A. MURRAY,
 MAY C. REA.